(12) United States Patent
Segal et al.

(10) Patent No.: US 12,199,817 B2
(45) Date of Patent: Jan. 14, 2025

(54) TECHNIQUES FOR MANAGING SMART HOME CONFIGURATIONS

(71) Applicant: APPLE INC., Cupertino, CA (US)

(72) Inventors: Oren Segal, Sunnyvale, CA (US); Manuel Roman Cuesta, Sunnyvale, CA (US); Andreas I. Gal, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/402,369

(22) Filed: Aug. 13, 2021

(65) Prior Publication Data

US 2022/0103422 A1 Mar. 31, 2022

Related U.S. Application Data

(60) Provisional application No. 63/083,415, filed on Sep. 25, 2020.

(51) Int. Cl.
*H04L 41/0806* (2022.01)
*H04L 9/40* (2022.01)
*H04L 12/28* (2006.01)

(52) U.S. Cl.
CPC ...... *H04L 41/0806* (2013.01); *H04L 12/2809* (2013.01); *H04L 12/282* (2013.01);
(Continued)

(58) Field of Classification Search
None
See application file for complete search history.

(56) References Cited

U.S. PATENT DOCUMENTS

2016/0036944 A1\* 2/2016 Kitchen .............. H04L 65/1026
709/203
2020/0267552 A1 8/2020 Lee et al.
(Continued)

FOREIGN PATENT DOCUMENTS

WO 2015184818 12/2015

OTHER PUBLICATIONS

Article, Muller et al., "An Assisted Device Registration and Service Access System for Future Home Networks", dated Dec. 15, 2009 in 5 pages.
(Continued)

*Primary Examiner* — Kevin S Mai
(74) *Attorney, Agent, or Firm* — Kilpatrick Townsend & Stockton LLP

(57) ABSTRACT

Techniques are provided for establishing a secure home ecosystem such that the one or more installers only have access to set-up accessories. A mobile device may identify a home device using a first wireless protocol. The mobile device may enable a secure channel between the home device and the mobile device via a second wireless protocol. The mobile device may authenticate access for the mobile device using an identification code. The mobile device may validate a home device certificate via a secure server. The mobile device may send a mobile device certificate to the home device via the secure channel. The mobile device may receive a signed mobile device certificate from the home device via the secure channel and receive accessory information corresponding to one or more accessory devices from the home device. The mobile device can be configured to connect to the one or more accessory devices.

20 Claims, 11 Drawing Sheets

(52) U.S. Cl.
CPC .. *H04L 63/0823* (2013.01); *H04L 2012/2841* (2013.01); *H04L 2012/285* (2013.01)

(56) References Cited

U.S. PATENT DOCUMENTS

2022/0070014 A1\* 3/2022 Schwartz .............. H04L 63/102
2022/0078015 A1\* 3/2022 Nainar .................. H04L 9/3213

OTHER PUBLICATIONS

International Search Report and Written Opinion issued in PCT Application No. PCT/US2021/050321, dated Jan. 3, 2022 in 14 pages.
"Intention to Grant," mailed Mar. 13, 2024, from the European Patent Office in Application No. 21 789 943.4-1213. 7 pages.

\* cited by examiner

TECHNIQUES FOR MANAGING SMART HOME CONFIGURATIONS

CROSS-REFERENCES TO RELATED APPLICATIONS

This application claims the benefit of U.S. Provisional Patent Application No. 63/083,415, entitled "Techniques For Managing Smart Home Configurations," filed Sep. 25, 2020, hereby incorporated by reference in its entirety and for all purposes.

BACKGROUND

Accessory devices, such as kitchen appliances, lighting fixtures, thermometers, etc., are often used in an automated environment, such as in a home automation environment. The accessory devices can be controlled by a controller device, such as, a laptop, mobile device, wearable device, etc.

For new construction or retrofit smart residences, a builder can hire one or more installers to configure the accessories to work with a home network. The majority of smart home installations are professionally done. Multiple installers may be used for different systems (e.g., lighting, heating ventilation air conditioning, security etc.) Often these configurations are complicated because the configurations are performed prior to a wireless communication network (e.g., utilizing Wi-Fi routers) being installed in the home. In addition, such installations can also present security risks to the new homeowner if the configuration information is stored on an installer's mobile device following completion of the installation. Storing the security information solely in a cloud environment can also present security issues if the server is compromised.

SUMMARY

Embodiments provide systems, devices, methods, and computer-readable media for managing smart home configurations. A home device can store one or more secure certificates. The installer can authenticate his or her mobile device to install accessories in the home. The installer can authenticate the installer mobile device by opening an App associated with the home device, selecting Installation Mode, and selecting an option to search for the home device. The installer can place the installer mobile device within close proximity (e.g., less than 4 centimeters) to authorize communication with the home device.

After the installer's mobile device has been authorized, the installer can authenticate the home device by checking the secure certificate of the home device through a network (e.g., the Internet). A remote secure server can validate the secure certificate of the home device to ensure that the home device is still valid and authorized to sign device certificates. Following validation, the installer device can provide an installer certificate to the home device for signature. The home device can return a signed certificate. The installer can enter information for the accessory such as a name, id, and location of the accessory. This information can be associated with the accessory identification and stored in the home device. The signed certificate can be used to authorize one or more accessories to operate in the home ecosystem. The signed certificate can expire after a predetermined time. The installer device can receive accessory information from the one or more accessory devices. The accessory information can be sent to and stored in a memory of the home device.

Upon completion of the installation of accessories, the builder can authenticate his or her device in a similar way as the installer. Upon authentication, the home device can send the accessory information to the builder mobile device. The builder mobile device can import the accessory information and update the available accessories controlled through an App on the builder mobile device. The builder can configure the accessories to suit one or more preferences (e.g., of the future homeowner or based on common usage) and operate the accessories using the builder mobile device. Changes made to the configuration or setting of the accessories can be uploaded and stored on the home device.

Upon sale of the house, the builder can transfer identification code to the new owner. The new owner can reset the identification code and import the accessory information to the owner mobile device. Once imported, the owner can add the devices directly to their own ecosystem (e.g., a home application running on their mobile device).

According to some implementations, a method may include identifying a home device using a first wireless protocol; enabling a secure channel between the home device and the mobile device via a second wireless protocol; authenticating access for the mobile device using an identification code; validating a home device certificate via a secure server; sending a mobile device certificate to the home device via the secure channel; receiving a signed mobile device certificate from the home device via the secure channel; and receiving accessory information corresponding to one or more accessory devices from the home device via the secure channel, the mobile device configured to connect to the one or more accessory devices.

According to some implementations, a method may include implementing, by a computing device with a first wireless protocol and a secure element, an installation mode for adding accessory devices to a physical environment; while in the installation mode: receiving, via the first wireless protocol, a first device information from a first device; establishing, by the computing device, a first secure channel with the first device in accordance with receipt of the first device information; receiving, via the first secure channel, accessory information corresponding to the accessory devices to be added to the physical environment; storing, by the computing device, the accessory information corresponding to the accessory devices; receiving second device information from a second device; establishing, by the computing device, a second secure channel with the second device in accordance with receipt of the second device information; and transmitting the accessory information corresponding to the accessory devices to the second device; terminating the installation mode; and while the installation mode is off: receiving third device information from a third device; establishing, by the computing device, a third secure channel with the third device in accordance with receipt of the third device information; transmitting the accessory information corresponding to the accessory devices to the third device; and sending control instructions to the accessory devices to control the accessory devices.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

Multiple instances of an element may be indicated by following a first number for the element with a letter or a hyphen and a second number.

DETAILED DESCRIPTION

In the following description, for the purposes of explanation, specific details are set forth in order to provide a thorough understanding of the exemplary embodiments. However, it will be apparent that various embodiments may be practiced without these specific details. The figures and description are not intended to be restrictive.

I. Overview of Home Environment

A home application on a controller device (e.g., laptop, mobile device, wearable device, etc.) may be used to control accessory devices in a home automated environment. The accessory devices can also be known as smart devices or smart home devices. For brevity, an accessory device may also be referred to as an accessory, and a controller device may also be referred to as a controller throughout the description. The home application can be used to control the operation of the accessory devices in an automated environment via the controller device. The automated environment can be, for example, within a home or office of the user. Additionally, in some examples, a resident device may be a type of a controller. A resident device (e.g., a network-connected media player and/or a television control unit) can be installed within the automated environment and it may be expected that the resident device will be relatively immobile (e.g., it generally resides within the home or office). Resident devices may be configured to control particular accessories (e.g., a television or external speakers); however, it may also control other accessories that are also controlled by other controllers, when those other controllers are in reach.

The techniques disclosed herein are not limited to single-family homes. The techniques can be used for setting up accessories in a multi-tenant dwelling (e.g., an apartment building). The system can be used by a building management company with multiple apartments in different buildings. Building managers can require access to the apartments remotely to setup accessories, change door access codes, and detect apartment issues (e.g., water leaks, appliances low on supplies). The system can provide for an efficient access control and auditing system. Normally, these systems can require permission of the tenant, except in legally approved cases (e.g., legal eviction). The techniques and devices disclosed herein can also be used to manage communal areas (e.g., recreation areas, gyms, pools, elevators, gates, garage doors, etc.).

As the system uses an installer's mobile device for network connectivity (e.g., the Internet), the system does not require Internet access to be established in the home during installation.

Figure 1:
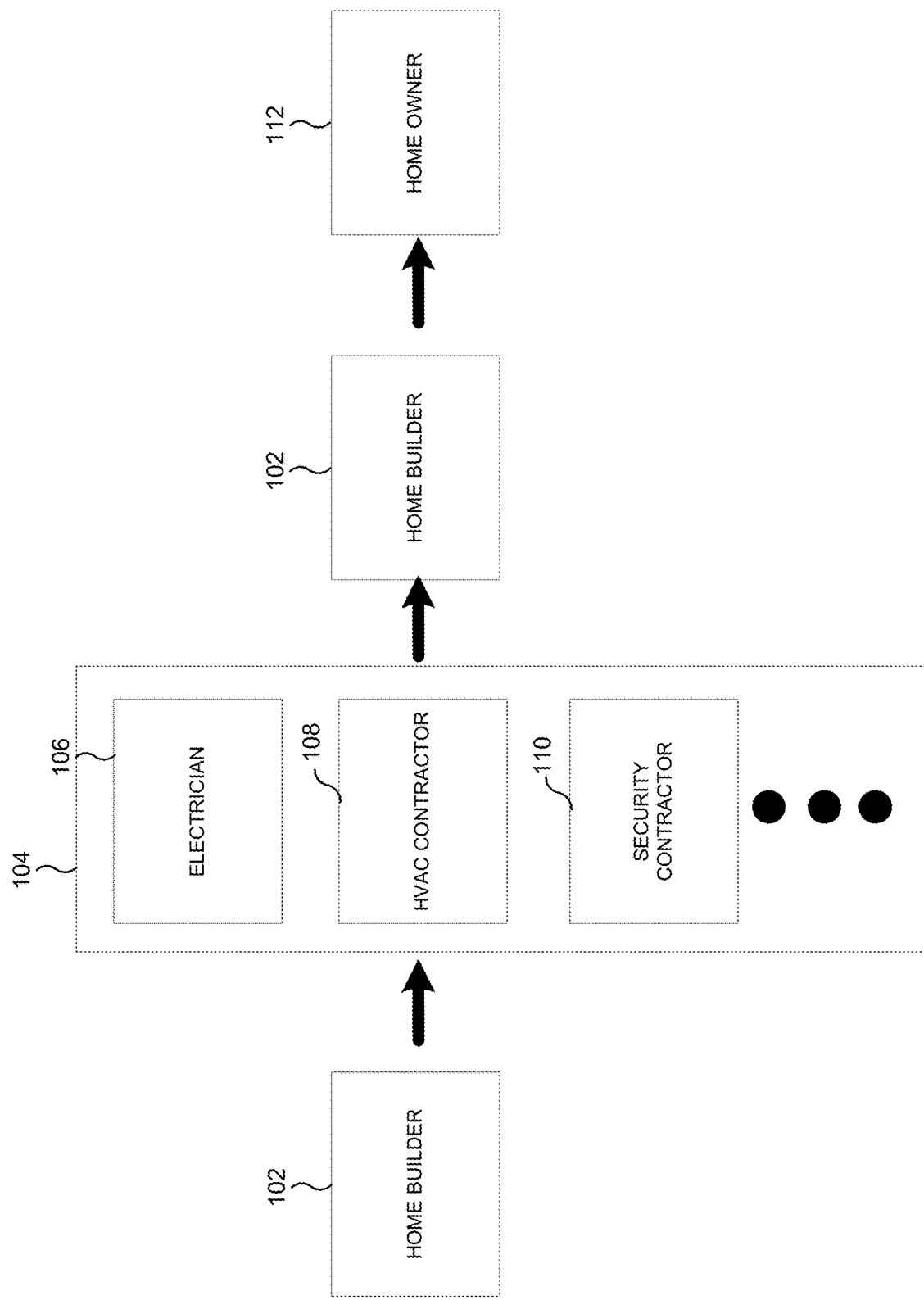
FIG. 1 illustrates a simplified flow diagram for managing a smart home configuration, in accordance with some example embodiments.

FIG. 1 illustrates a simplified flow diagram for managing a smart home configuration, in accordance with some example embodiments.

A smart home may include various connected devices from smart door locks to light switches to smart thermostats. As these devices can allow a homeowner to operate these devices remotely through a home network these devices need to be secure to prevent unauthorized access. Therefore, procedures for establishing a secure home network can involve sharing a secret with the various devices during installation. The shared secret can be used to verify that the remote device is authorized to access or control the different components of the home network.

A home can be constructed as a smart home from the beginning by installing one or more smart devices into the home during construction. Alternatively, existing homes can be retrofitted as a smart home. The homebuilder 102 can first be granted rights for installing the home system. The homebuilder 102 can transfer all or a portion of these rights to one or more other users (e.g., a contractor 104) for installation and authorization of the accessories. Often smart home installations are performed by multiple contract installers because the type of smart devices can vary. For example, an electrician 106 may install smart lights or smart outlets, a heating ventilation air conditioning technician 108 can install smart thermostats, and a security contractor 110 can install various alarm system components. Therefore, different contractors 104 will require access to the security credentials to set-up the home system. However, it is not ideal for the contractors 104 to continue to have access to the home system after the installation is complete. After the installation or multiple installations are complete the access can be transferred from the contractors 104 to the homebuilder 102 until the house is sold. After the house is completed and sold, the homebuilder 102 can transfer access of the home system the new homeowner 112. Upon transfer to the homeowner 112, neither the contractors 104 nor the homebuilder 102 should continue to have rights to access or modify the home system.

Figure 2:
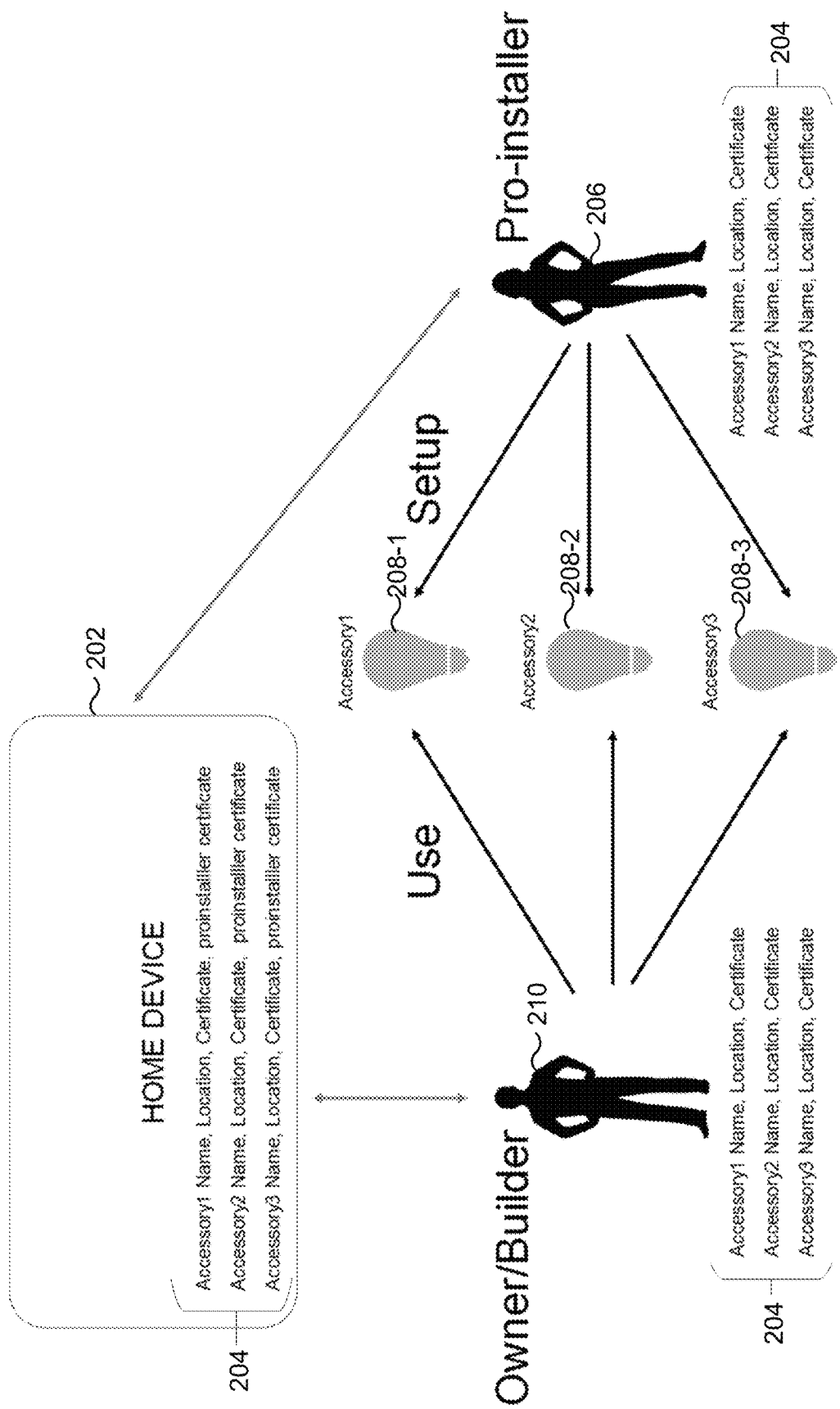
FIG. 2 illustrates a use case for managing a smart home configuration, in accordance with some example embodiments.

FIG. 2 illustrates a use case for managing a smart home configuration, in accordance with some example embodiments. The home system can include a home device 202. The home device 202 can include one or more transceivers to enable communication via one or more communication protocols (e.g., Bluetooth including Bluetooth Low Energy (BLE), Thread, Near Field Communication (NFC), Wi-Fi, etc.) The home device 202 can include a secure storage for storing one or more shared secrets. The home device 202 can also include a storage device to store one or more configurations for the accessories in the home system. The home device 202 can also access cloud storage for storing one or more home configuration, accessory information 204 and/or one or more secure certificates. The accessory information 204 can include the name of the accessories, a location of the accessories, and one or more installation certificates. The accessory information 204 can also include one or more programmable settings for the accessories. The accessory information 204 can include one or more templates of the house informing an installer of a type and location for installing various accessories.

The installer 206 can receive secure certificates and one or more templates from the home device 202 via one of the transceivers. The secure certificate can be transferred to a mobile device for the installer and stored in a memory of the mobile device. The installer 206 can establish communications with an accessory 208-1, 208-2, and 208-3 through a wired or wireless protocol (e.g., Bluetooth, Thread, NFC, Wi-Fi etc.). Although only three accessories 208-1, 208-2, and 208-3 (depicted as lightbulbs) are illustrated in FIG. 2, the techniques disclosed herein are not limited in the number or type of accessories 208-1, 208-2, and 208-3. The installer 206 can transfer the secure certificate to the one or more accessories 208-1, 208-2, and 208-3 via a wireless protocol. The one or more accessories 208-1, 208-2, and 208-3 can store the secure certificate in a memory of the accessory 208-1, 208-2, and 208-3. The secure certificate can authorize the accessory 208-1, 208-2, and 208-3 to function in the home ecosystem. The accessory 208-1, 208-2, and 208-3 can transfer accessory information 204 to the installer mobile device. The accessory information 204 can be stored temporarily the memory of the mobile device. The accessory information 204 can include a name, an identification number, a location, a setting information, and one or more configuration settings for the accessory 208-1, 208-2, and 208-3. The installer mobile device can send the accessory information 204 to the home device 202 via a wired or wireless protocol. After installation is complete, the accessory information 204 and the secure certificate can be deleted from the memory of the installer mobile device.

After the accessories 208-1, 208-2, and 208-3 have been installed and configured, the accessory information 204 can be transferred to the builder mobile device. The home device 202 can transfer the accessory information 204 and secure certificate to the builder mobile device via a wired or wireless protocol. The builder can customize the one or more installed accessories 208-1, 208-2, and 208-3 to suite his or her preferences. The builder can use the mobile device to control the one or more accessories 208-1, 208-2, and 208-3 (e.g., activate a light, adjust the temperature of the home, and unlock/lock a door.) The builder 210 can control the one or more accessories 208-1, 208-2, and 208-3 by sending commands via one or more wireless communication protocols to the one or more accessories 208-1, 208-2, 208-3. The builder can also receive a status of one or more accessories 208-1, 208-2, 208-3 via one or more wireless communication protocols. In some cases the builder can provide an agent (e.g., a real estate agent) control of the one or more accessories 208-1, 208-2, and 208-3 to enable maintenance or showing the home.

After ownership of the home is transferred from the builder 210 to a new owner, the builder 210 can transfer the accessory information 204 and secure certificate to the new owner. After the transfer is complete, the accessory information 204 and secure certificate can be deleted from the builder mobile device. The new owner can also change the identification code for the home device 202. In this way, the builder 210 will lose the ability to control or program any of the accessories 208-1, 208-2, and 208-3. The new owner will be able to adjust the settings of the accessories 208-1, 208-2, and 208-3. The new owner will also be able to create a temporary identification code if they rent the house out. In this way, they retain overall control of the system.

II. Installer Process

Figure 3:
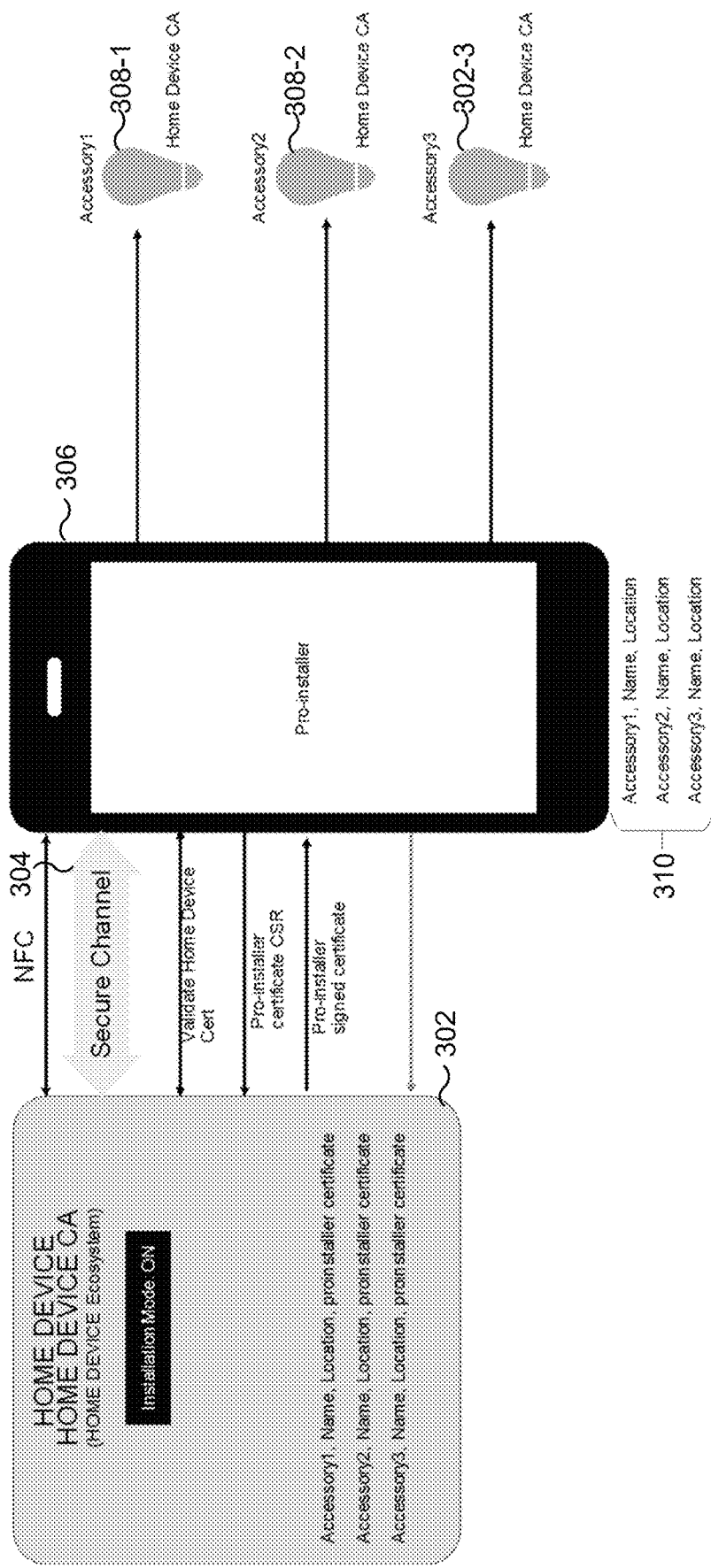
FIG. 3 illustrates a process performed by an installer for managing a smart home configuration, in accordance with some example embodiments.

FIG. 3 illustrates a process 300 performed by an installer for managing a smart home configuration, in accordance with some example embodiments.

The installer can establish communication with the home device 302 over a wireless communication channel 304 using an installer mobile device 306. The secure channel 304 can be established based on the NFC protocol. Alternatively, the secure channel 304 can use other wireless protocols (e.g., Bluetooth, Thread, Wi-Fi, etc.) Using a user interface for an App on the installer mobile device 306, the installer can select an installation mode on the home device 302. In embodiments using NFC protocol, the installer mobile device can establish communications with the home device 302 by moving the device within the communication threshold (e.g., less than 4 centimeters) for NFC. The home device 302 can establish a secure channel 304 between the home device 302 and the installer mobile device 306. The secure channel 304 can use a second wireless protocol. If the identification code does not match the stored identification code, the App can prompt the user to enter the identification again. Access to the home device 302 can be locked after a preset number of incorrect identification codes has been entered over a predetermined time period. By using NFC and a PIN, the installer must be within close proximity to the home device 302 and have knowledge of the secure PIN. Requiring physical possession of the home device 302 and requiring an identification code provides multiple layers of protection to protect against unauthorized users gaining access to the home ecosystem.

After the secure channel 304 is established, the installer mobile device 306 can receive a home device security certification from the home device 302. The installer mobile device 306 can validate the home device 302 security certification via a network (e.g., the Internet). Upon validation of the home device 302 security certification, the installer mobile device 306 can send a certificate signing request (CSR) for the installer mobile device 306 to the home device 302. A CSR is a block of encoded text that is given to a Certificate Authority (CA) when applying for a certificate validated by the CA. It is usually generated on the server where the certificate will be installed and contains information that will be included in the certificate such as the organization name, common name (domain name), locality, and country. It also contains the public key that will be included in the certificate. A private key is usually created at the same time that you create the CSR, making a key pair. A certificate authority will use a CSR to create a certificate, but it does not need the private key.

The home device 302 can sign the CSR and send the signed certificate to the installer mobile device 306 via the secure channel 304. The signed CSR can be stored in the memory of the installer mobile device 306.

The installer can use the signed CSR to setup one or more accessories 308-1, 308-2, and 308-3 for use within the home ecosystem. The installer mobile device 306 can send the CA certificate to one or more accessories 308-1, 308-2, and 308-3. The one or more accessories 308-1, 308-2, and 308-3 can store the CA certificate in a memory. The installer can use the installer mobile device to pair with the one or more accessories 308-1, 308-2, and 308-3. The pairing process can use a protocol that defines security measures that can be used to prevent unauthorized controllers from operating an accessory. For example, an accessory can be configured to accept requests only from a controller that has previously established a pairing with the accessory and is therefore recognized by the accessory. Establishing a pairing can include exchanging long-term public keys between the accessory and controller in a secure manner, with each device persistently storing the keys. The protocol can specify the pair setup procedure so as to reduce risk of a pairing being established without approval of the accessory's owner/operator. For example, during a pair setup process a user may be required to read a setup code presented by one device (e.g., the accessory) and input the setup code into the other device (e.g., the controller) or to place the devices in physical proximity to each other. Once a pairing is established, the pairing can be leveraged to provide end-to-end message encryption such that only the paired controller and accessory can read messages exchanged between them. For example, when an accessory and controller that previously established a pairing reconnect, they can verify the previous pairing (e.g., by proving that each possesses the other's long-term public key) and generate session-specific encryption keys. More details on the specific pairing process can be found in U.S. Pat. No. 9,979,625 which is herein incorporated by reference.

An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi, Bluetooth, Bluetooth LE, or the like. A controller can be implemented, for example, on a general-purpose computing device such as a desktop computer, laptop computer, tablet computer, mobile phone, other handheld or wearable computing device, by providing the general-purpose computing device with appropriate executable program code; alternatively, a controller can be a special-purpose computing device.

The controller creates the accessory information. The controller (e.g., the installer mobile device 306) can retrieve the serial number, for example, but the name and location is created by the installer on the controller. This information is not sent to the one or more accessories 308-1, 308-2, and 308-3. The accessory information 310 can be stored in the memory of the installer mobile device 306. The installer can complete the process of authorizing one or more accessories 308-1, 308-2, and 308-3. After the last accessory is authorized, the installer mobile device can send the accessory information 310 to the home device 302. The home device 302 can store the accessory information 310 in a memory. The accessory information 310, the CA certificate and signed CSR can be deleted from the installer mobile device 306.

In various embodiments, the installer signed certificate can expire after a predetermined number of hours from receipt of the certificate from the home device 302. The home device 302 can also include a three-dimensional (3D) map of the house or building. In various embodiments, the builder or contractors can scan the home or building and store the 3D map in the home device 302. The home device 302 can include vendor specific data that may only be meaningful to certain controllers (e.g., home network automations).

III. Builder Process

Figure 4:
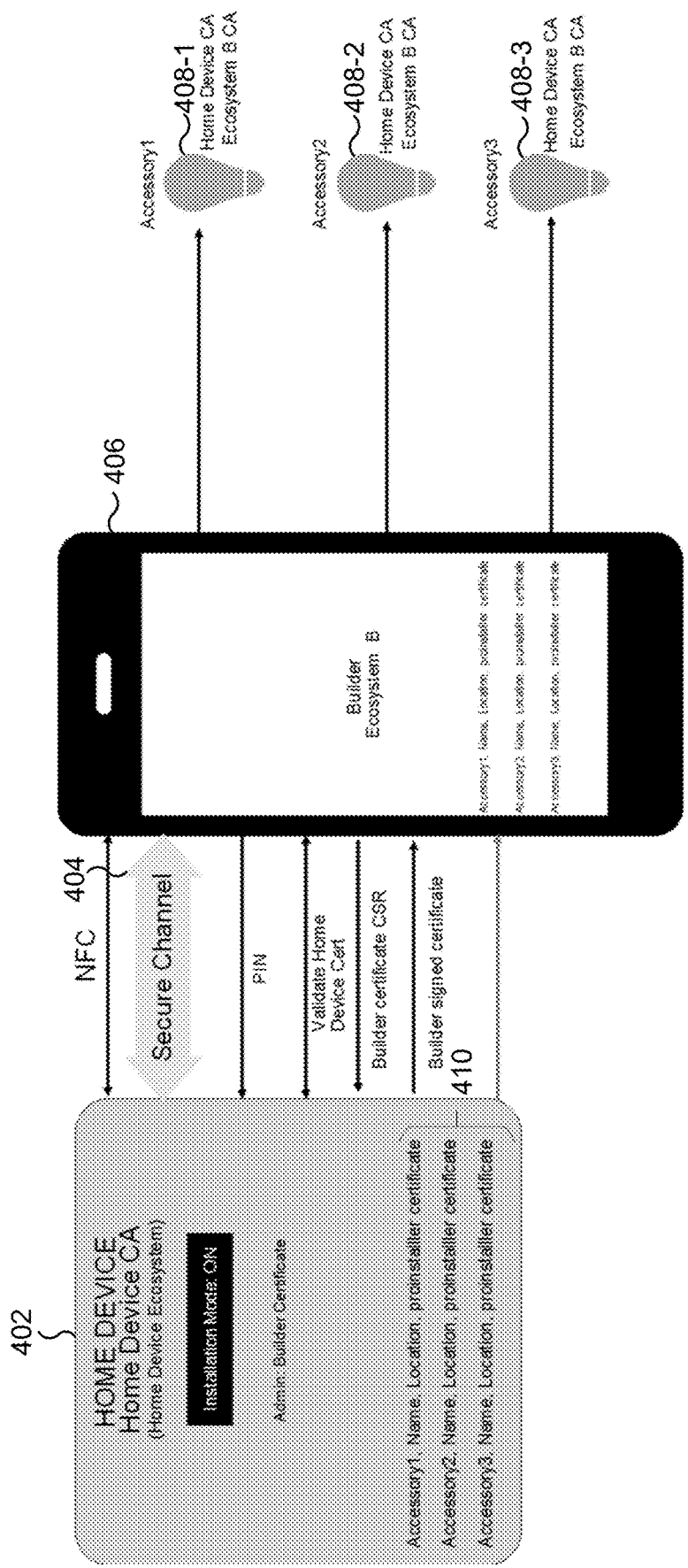
FIG. 4 illustrates a process performed by a builder for managing a smart home configuration, in accordance with some example embodiments.

FIG. 4 illustrates a process 400 performed by a builder for managing a smart home configuration, in accordance with some example embodiments.

The builder can establish communication with the home device 402 over a secure channel 404. The secure channel 404 can use NFC protocol. The builder can select an installation mode on the home device 402. In embodiments using NFC protocol, the builder mobile device 406 can establish communications with the home device 402 by moving the builder mobile device 406 within the communication threshold for NFC (e.g., less than 4 cm). Establishing communication between the home device 402 and the builder mobile device 406 can prompt the builder to enter an identification code (e.g., a PIN) using a user interface for an App associated with the home device 402 on the builder mobile device 406. The builder mobile device 406 can send the entered identification code to the home device 402. If the identification code matches a stored identification code, the home device 402 can establish a secure channel between the home device 402 and the builder mobile device 406. The secure channel 404 can use a second wireless protocol (e.g., Bluetooth, Thread, Wi-Fi, etc.). If the identification code does not match the stored identification, the App can prompt the user to enter the identification again. Access to the home device 402 can be locked after a preset number of incorrect identification codes has been entered over a predetermined time period. By using NFC and a PIN, the builder must be within close proximity to the home device and have knowledge of the secure PIN. This provides an additional layer of protection to protect against unauthorized users gaining access to the system.

After the secure channel 404 is established, the builder mobile device 406 can receive a home device security certification from the home device 402. The builder mobile device 406 can validate the home device security certification via a network (e.g., the Internet). Upon validation of the home device security certification, the builder mobile device 406 can send a certificate signing request (CSR) for the builder mobile device 406 to the home device 402.

The home device 402 can sign the certificate and send the signed certificate to the builder mobile device 406 via the secure channel 404. The signed certificate can be stored in the memory of the builder mobile device 406.

The home device 402 can transfer the accessory information 410 to the builder mobile device 406. The accessory information 410 can be stored in the memory of the builder mobile device 406. The builder can import the accessory information 410 into a mobile App for controlling the one or more accessories 408-1, 408-2, and 408-3. The builder can customize the operations of the accessories 408-1, 408-2, and 408-3 in accordance with the protocol for the accessories 408-1, 408-2, and 408-3. The builder can control the one or more accessories 408-1, 408-2, and 408-3 using a user interface on the builder mobile device 406. The builder mobile device 406 send the revise accessory information 410 to be stored in the home device 402.

IV. Owner Process

Figure 5:
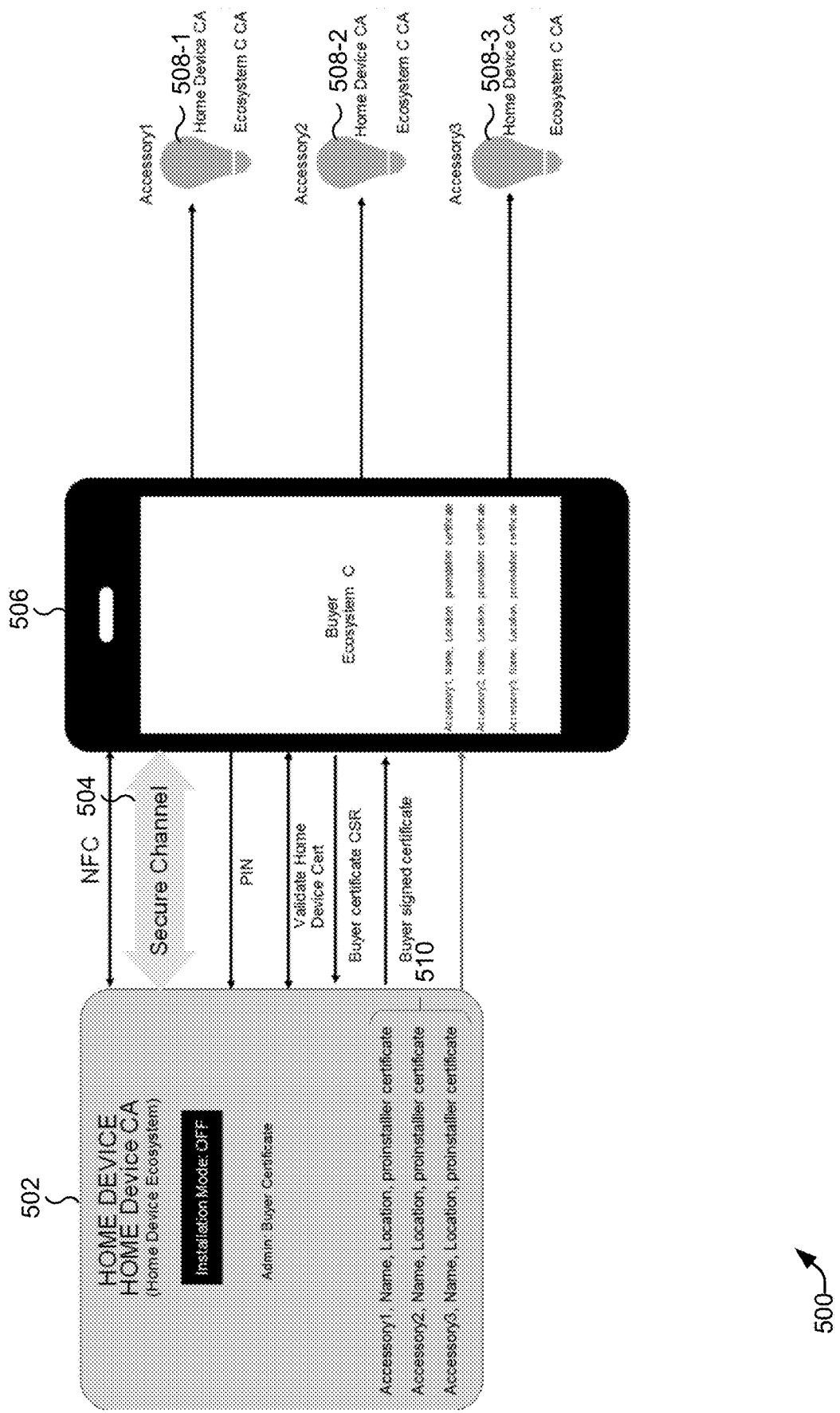
FIG. 5 illustrates a process performed by a new owner/buyer for managing a smart home configuration, in accordance with some example embodiments.

FIG. 5 illustrates a process 500 performed by a new owner/buyer for managing a smart home configuration, in accordance with some example embodiments.

The new owner/buyer ("owner") can establish communication with the home device 502 over a secure channel 504. The secure channel 504 can use NFC protocol. The owner can select an installation mode on the home device 502. In embodiments using NFC protocol, the owner mobile device 506 can establish communications with the home device by moving the device within the communication threshold for NFC (e.g., less than 4 cm). Establishing communication between the home device 502 and the owner mobile device 506 can prompt the owner to enter an identification code using a user interface for an App associated with the home device 502 on the owner mobile device 506. The owner mobile device 506 can send the entered identification code to the home device 502. If the identification code matches a stored identification code, the home device 502 can establish a secure channel 504 between the home device 502 and the owner mobile device 506. The secure channel 504 can use a second wireless protocol (e.g., Bluetooth, thread, Wi-Fi). If the identification code does not match the stored identification, the App can prompt the user to enter the identification again. Access to the home device 502 can be locked after a preset number of incorrect identification codes has been entered over a predetermined time period. By using NFC and a PIN, the owner must be within close proximity to the home device 502 and know knowledge of the secure PIN. This provides an additional layer of protection to protect against unauthorized users gaining access to the home ecosystem. In some embodiments, the owner entering a correct identification code can turn off the installation mode on the home device 502.

After the secure channel 504 is established, the owner mobile device 506 can receive a home device 502 security certificate from the home device. The owner mobile device 506 can validate the home device 502 security certificate via a network (e.g., the Internet). Upon validation of the home device 502 security certificate, the owner mobile device 506 can send a certificate signing request (CSR) for the owner mobile device 506 to the home device 502.

The home device 502 can sign the CSR and send the signed certificate to the owner mobile device 506 via the secure channel. The signed certificate can be stored in the memory of the owner mobile device 506.

The home device 502 can transfer the accessory information 510 to the owner mobile device 506. The accessory information 510 can be stored in the memory of the owner mobile device 506. The owner can import the accessories into a mobile App for controlling the one or more accessories 508-1, 508-2, and 508-3. The owner can customize the operations of the one or more accessories 508-1, 508-2, and 508-3 in accordance with the protocol for the one or more accessories 508-1, 508-2, and 508-3. The owner can control the one or more accessories 508-1, 508-2, and 508-3 using a user interface on the owner mobile device 506.

Figure 6:
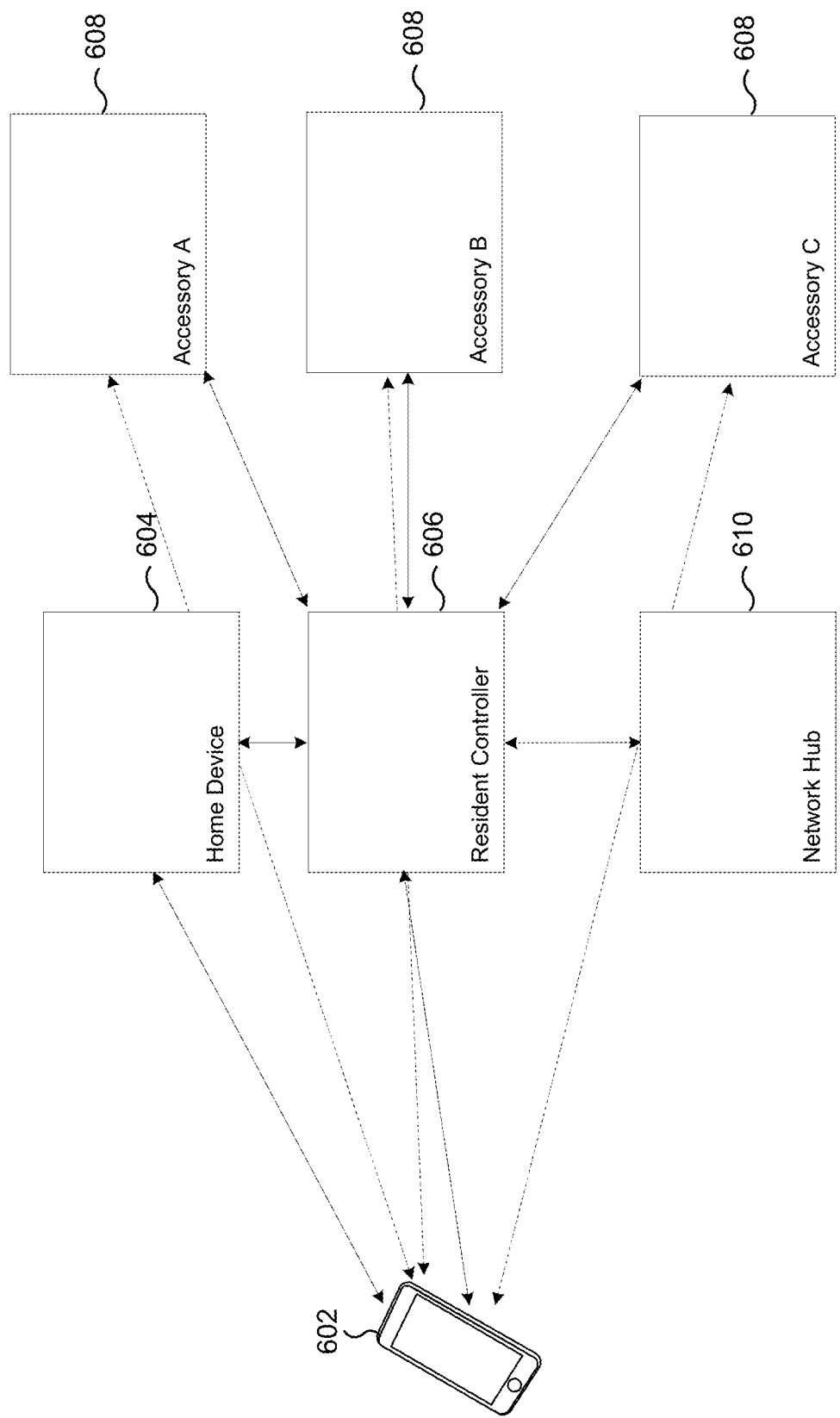
FIG. 6 illustrates a simplified diagram for a system for managing a smart home configuration, in accordance with some example embodiments.

FIG. 6 illustrates a simplified diagram for an ecosystem 600 for managing a smart home configuration, in accordance with some example embodiments. The ecosystem 600 can include a controller 602, a home device 604, a resident controller 606, one or more accessories 608, and a network hub 610.

The ecosystem 600 can include a controller device 602. The controller device 602 can include a mobile device (e.g., a smartphone). The controller device 602 can also include a wearable device (e.g., a smartwatch, smart glasses), a tablet device, a laptop computer or a desktop computer. The controller device 602 can communicate with the home device 604 via a wireless protocol (e.g., NFC, Bluetooth, Thread, or Wi-Fi). In some embodiments, the controller device 602 can communicate with the home device 604 via a wired protocol. The controller device can communicate with the one or more accessories 608-1, 608-2, and 608-3 via a wireless protocol (e.g., NFC, Bluetooth, Thread, or Wi-Fi). The controller device 602 can also communicate with the resident controller 606 via a wireless protocol (e.g., NFC, Bluetooth, Thread, or Wi-Fi). The resident controller 606 can control one or more resident devices including a home entertainment device or smart speaker system. The controller device 602 can include any one of the installer mobile device 306, the builder mobile device 406 or the owner mobile device 506 previously discussed above. Additional details regarding the controller device 602 are discussed below in Section VIII.

The resident controller 606 can also communicate with the one or more accessories 608-1, 608-2, and 608-3 via a wireless protocol (e.g., NFC, Bluetooth, Thread, or Wi-Fi). The resident controller 606 can also communicate with the network hub 610 via a wired or wireless protocol (Bluetooth, Thread, or Wi-Fi, etc.) The network hub 610 can connect the home ecosystem 600 to a network (e.g., the Internet).

V. Flow for Managing Smart Home Configuration Using a Mobile Device

Figure 7:
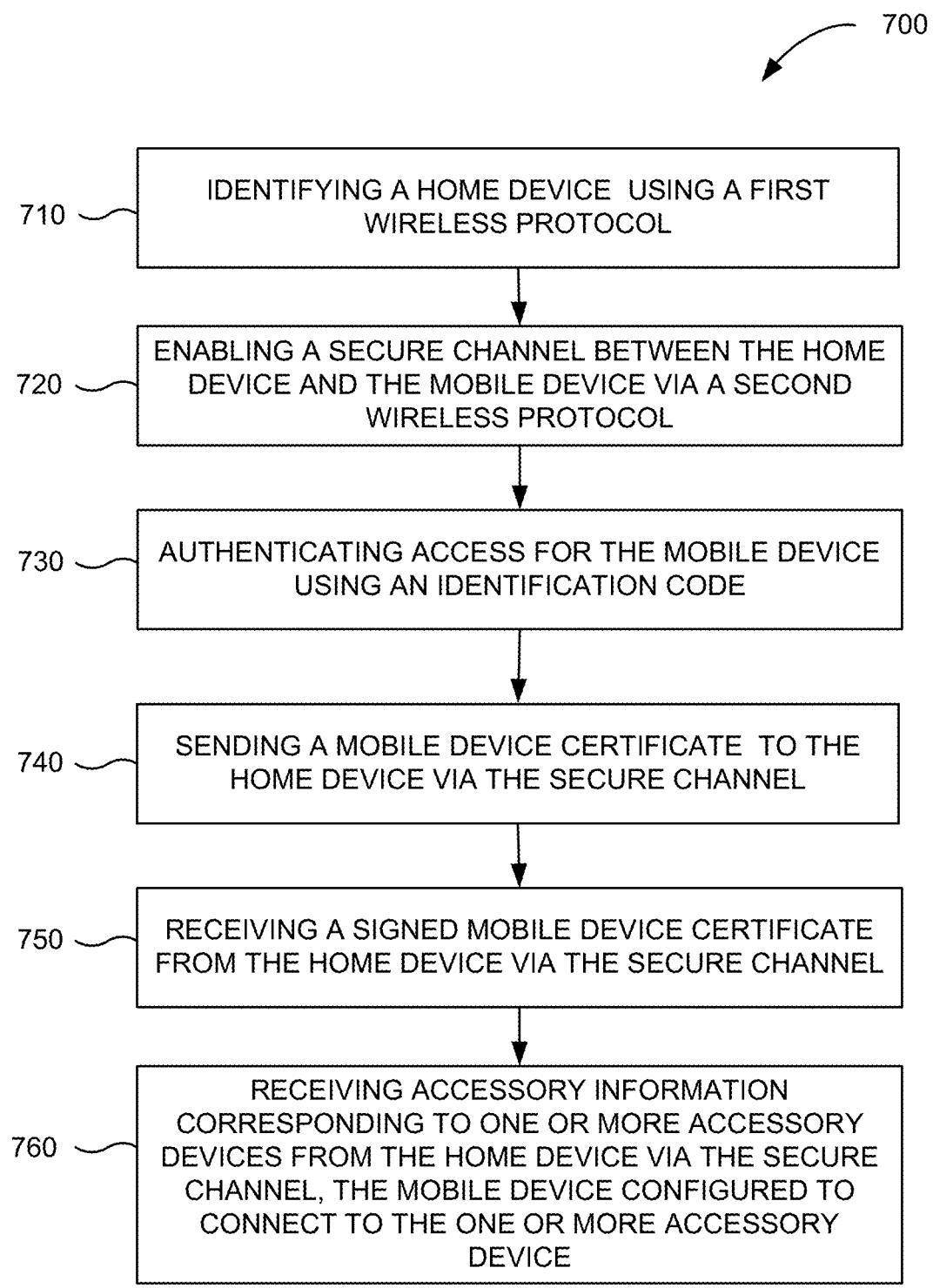
FIG. 7 illustrates a flowchart for a technique for managing a smart home configuration by a mobile device, in accordance with some example embodiments.

FIG. 7 illustrates a flowchart for a technique for managing a smart home configuration by a mobile device, in accordance with some example embodiments.

FIG. 7 is a flow chart of an example process 700 for techniques for managing smart home configuration. In some implementations, one or more process blocks of FIG. 7 can be performed by a mobile device. In some implementations, one or more process blocks of FIG. 7 can be performed by another device or a group of devices separate from or including the mobile device.

Figure 11:
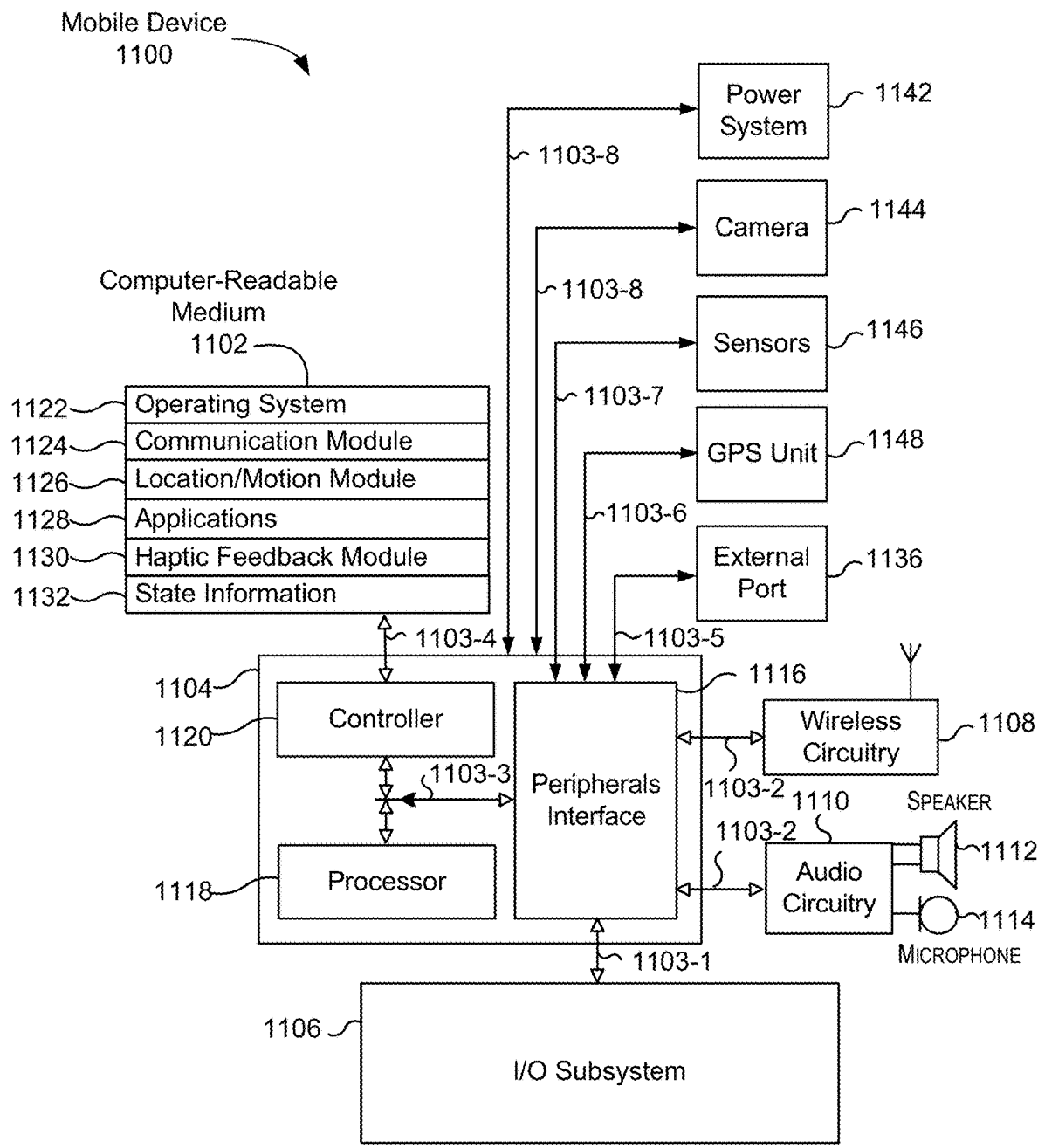
FIG. 11 illustrates a block diagram of an example mobile device, in accordance with some embodiments.

At 710, process 700 can include identifying a home device using a first wireless protocol. For example, the mobile device (e.g., using processor 1118, computer readable medium 1102, applications 1128, wireless circuitry 1108, I/O subsystem 1106, and/or the like as illustrated in FIG. 11 and described below) can identify a home device using a first wireless protocol, as described above. The first wireless protocol can include NFC, Bluetooth, Thread, or Wi-Fi.

At 720, process 700 can include enabling a secure channel between the home device and the mobile device via a second wireless protocol. For example, the mobile device (e.g., using processor 1118, computer readable medium 1102, applications 1128, wireless circuitry 1108, I/O subsystem 1106, and/or the like as illustrated in FIG. 11 and described below) can enable a secure channel between the home device and the mobile device via a second wireless protocol, as described above. The second wireless protocol can include NFC, Bluetooth, Thread, or Wi-Fi.

At 730, process 700 can include authenticating access for the mobile device using an identification code. For example, the mobile device (e.g., using processor 1118, computer readable medium 1102, applications 1128, wireless circuitry 1108, I/O subsystem 1106, and/or the like as illustrated in FIG. 11 and described below) can authenticate access for the mobile device using an identification code, as described above. The identification code can include a PIN code. The PIN code can be a combination of alphanumeric characters and vary in length. The identification code can be changed from the preset code assigned to the home device by the manufacturer.

In some embodiments, process 700 can include validating a home device certificate via a secure server. For example, the mobile device (e.g., using processor 1118, computer readable medium 1102, applications 1128, wireless circuitry 1108, I/O subsystem 1106, and/or the like as illustrated in FIG. 11 and described below) can validate a home device certificate via a secure server, as described above. The validating the home device certificate can include sending the home device certificate to a secure server through the functions of an App on the mobile device. The secure server can validate that the home device certificate is valid. If the secure server determines that the home device certificate is valid, the secure server can send back a message to the mobile device.

At 740, process 700 can include sending a mobile device certificate sign request to the home device via the secure channel. For example, the mobile device (e.g., using processor 1118, computer readable medium 1102, applications 1128, wireless circuitry 1108, I/O subsystem 1106, and/or the like as illustrated in FIG. 11 and described below) can send a mobile device certificate to the home device via the secure channel, as described above. The mobile device certificate can be generated by an App in the mobile device. The mobile device certificate can be sent via a wireless protocol (NFC, Bluetooth, Thread, or Wi-Fi). The home device can execute the certificate sign request and return the signed certificate to the mobile device.

At 750, process 700 can include receiving a signed mobile device certificate from the home device via the secure channel. For example, the mobile device (e.g., using processor 1118, computer readable medium 1102, applications 1128, wireless circuitry 1108, I/O subsystem 1106, and/or the like as illustrated in FIG. 11 and described below) can receive a signed mobile device certificate from the home device via the secure channel, as described above. The home device can sign the mobile device certificate and transmit the signed certificate to the mobile device via the secure channel.

At 760, process 700 can include receiving accessory information corresponding to one or more accessory devices from the home device via the secure channel, the mobile device configured to connect to the one or more accessory devices. For example, the mobile device (e.g., using processor 1118, computer readable medium 1102, applications 1128, wireless circuitry 1108, I/O subsystem 1106, and/or the like as illustrated in FIG. 11 and described below) can receive accessory information corresponding to one or more accessory devices from the home device via the secure channel, the mobile device configured to connect to the one or more accessory devices, as described above. The mobile device can receive the accessory information corresponding to the one or more accessory devices via a secure channel using a wireless protocol (NFC, Bluetooth, Thread, or Wi-Fi).

Process 700 can include additional implementations, such as any single implementation or any combination of implementations described below and/or in connection with one or more other processes described elsewhere herein. It should be appreciated that the specific steps illustrated in FIG. 7 provide particular techniques for managing smart home configuration according to various embodiments. Other sequences of steps can also be performed according to alternative embodiments. For example, alternative embodiments can perform the steps outlined above in a different order. Moreover, the individual steps illustrated in FIG. 7 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the mobile device includes a graphical user interface to receive one or more inputs to adjust settings of the one or more accessory devices. The mobile device can include a touchscreen display to receive one or more inputs to adjust or customize the settings of the accessories.

In some implementations, the mobile device is configured to update the one or more accessory devices with a device ecosystem associated with the mobile device. The mobile device can transfer a secure certificate to authorize the one or more accessories to operate in the secure environment.

In some implementations, the first wireless protocol is near field communication. For NFC, the mobile device needs to be within close proximity (e.g., less than 4 centimeters) from the home device to receive the NFC signal.

In some implementations, process 700 includes sending the signed mobile device certificate via the first wireless protocol to an accessory device of the one or more accessory devices to enter a set-up mode; receiving one or more inputs via the mobile device, the inputs specifying a configuration for the accessory device; and sending the configuration for the accessory device to the home device via the second wireless protocol.

In some implementations, the second wireless protocol is Bluetooth Low Energy protocol.

In some implementations, the accessory information includes at least one of an accessory identifier, accessory capabilities, or current accessory settings.

Although FIG. 7 shows example steps of process 700, in some implementations, process 700 can include additional steps, fewer steps, different steps, or differently arranged steps than those depicted in FIG. 7. Additionally, or alternatively, two or more of the steps of process 700 can be performed in parallel.

VI. Flow for Managing Smart Home Configuration Using a Home Device

Figure 8:
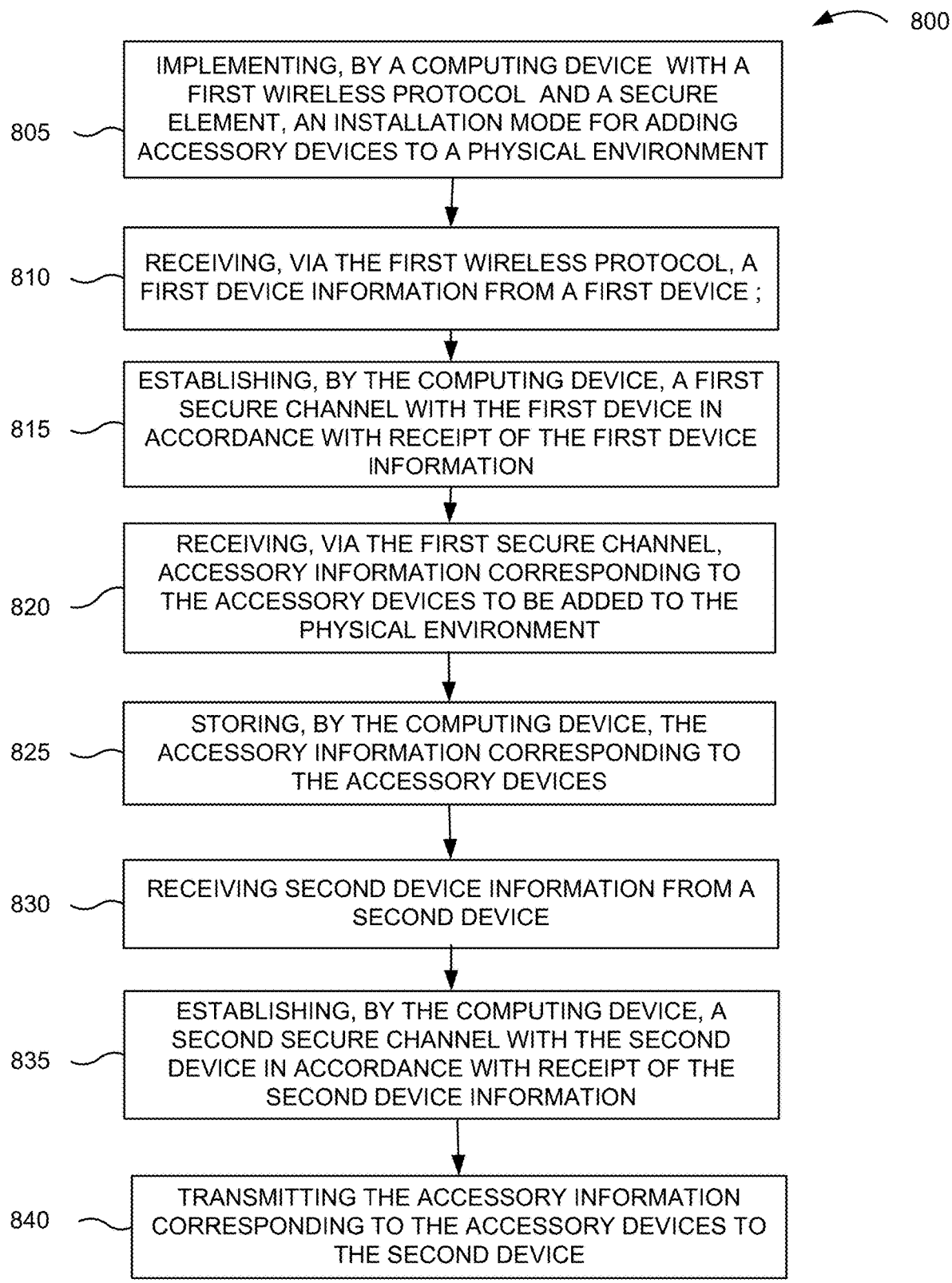
FIG. 8 illustrates a flowchart for a technique for managing a smart home configuration by a home device, in accordance with some example embodiments.

FIG. 8 illustrates a flowchart for a technique for managing a smart home configuration by a home device, in accordance with some example embodiments. FIG. 8 is a flow chart of an example process 800 for techniques for managing smart home configuration. In some implementations, one or more process blocks of FIG. 8 can be performed by a computer device. In some implementations, one or more process blocks of FIG. 8 can be performed by another device or a group of devices separate from or including the computer device.

At 805, process 800 can include implementing, using a secure element, an installation mode for adding accessory devices to a physical environment. For example, the computer device (e.g., using processor 1118, computer readable medium 1102, applications 1128, wireless circuitry 1108, I/O subsystem 1106, and/or the like as illustrated in FIG. 11 and described below) can implement, via a secure element, an installation mode for adding accessory devices to a physical environment, as described above. The secure element can store one or more CA certificates in a memory of the home device. The installation mode can allow the installer, the builder or the owner to modify (add or remove) one or more accessories from the home ecosystem.

At 810, process 800 can include while in the installation mode: receiving, via the first wireless protocol, a first device information from a first device. For example, the computer device (e.g., using processor 1118, computer readable medium 1102, applications 1128, wireless circuitry 1108, I/O subsystem 1106, and/or the like as illustrated in FIG. 11 and described below) can while in the installation mode, as described above. The first wireless protocol can include NFC, Bluetooth, Thread, or Wi-Fi. The first device can include one of an installer mobile device, a builder mobile device, or an owner mobile device. The first device information can include an identifier (e.g., IMEI number) of one of the installer mobile device, the builder mobile device, or an owner mobile device.

At 815, process 800 can include establishing a first secure channel with the first device in accordance with receipt of the first device information. For example, the computer device (e.g., using processor 1118, computer readable medium 1102, applications 1128, wireless circuitry 1108, I/O subsystem 1106, and/or the like as illustrated in FIG. 11 and described below) can establish a first secure channel with the first device in accordance with receipt of the first device information, as described above. The secure channel can use a wireless protocol using NFC, Bluetooth, Thread, or Wi-Fi. The first device information can include one of an installer mobile device certificate, a builder device certificate, or an owner device certificate.

At 820, process 800 can include receiving, via the first secure channel, accessory information corresponding to the accessory devices to be added to the physical environment. For example, the computer device (e.g., using processor 1118, computer readable medium 1102, applications 1128, wireless circuitry 1108, I/O subsystem 1106, and/or the like as illustrated in FIG. 11 and described below) can receive, via the first secure channel, accessory information corresponding to the accessory devices to be added to the physical environment, as described above.

At 825, process 800 can include storing the accessory information corresponding to the accessory devices. For example, the computer device (e.g., using processor 1118, computer readable medium 1102, applications 1128, wireless circuitry 1108, I/O subsystem 1106, and/or the like as illustrated in FIG. 11 and described below) can store the accessory information corresponding to the accessory devices, as described above.

At 830, process 800 can include receiving second device information from a second device. For example, the computer device (e.g., using processor 1118, computer readable medium 1102, applications 1128, wireless circuitry 1108, I/O subsystem 1106, and/or the like as illustrated in FIG. 11 and described below) can receive second device information from a second device, as described above.

At 835, process 800 can include establishing a second secure channel with the second device in accordance with receipt of the second device information. For example, the computer device (e.g., using processor 1118, computer readable medium 1102, applications 1128, wireless circuitry 1108, I/O subsystem 1106, and/or the like as illustrated in FIG. 11 and described below) can establish a second secure channel with the second device in accordance with receipt of the second device information, as described above.

At 840, process 800 can include transmitting the accessory information corresponding to the accessory devices to the second device. For example, the computer device (e.g., using processor 1118, computer readable medium 1102, applications 1128, wireless circuitry 1108, I/O subsystem 1106, and/or the like as illustrated in FIG. 11 and described below) can transmit the accessory information corresponding to the accessory devices to the second device, as described above. The accessory information 204 can include a name, an identification number, a location, a setting information, and one or more configuration settings for the accessory.

At 845, process 800 can include terminating the installation mode. For example, the computer device (e.g., using processor 1118, computer readable medium 1102, applications 1128, wireless circuitry 1108, I/O subsystem 1106, and/or the like as illustrated in FIG. 11 and described below) can terminate the installation mode, as described above.

Process 800 can include additional implementations, such as any single implementation or any combination of implementations described below and/or in connection with one or more other processes described elsewhere herein. It should be appreciated that the specific steps illustrated in FIG. 8 provide particular techniques for managing smart home configuration according to various embodiments. Other sequences of steps can also be performed according to alternative embodiments. For example, alternative embodiments can perform the steps outlined above in a different order. Moreover, the individual steps illustrated in FIG. 8 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the first device is configured to pair with the accessory devices and configure the accessory devices with a computing device ecosystem associated with the computing device.

In some implementations, the second device is configured to connect to the accessory devices, update the accessory devices with a second device ecosystem associated with the second device, and configure settings of the accessory devices.

In some implementations, the third device is configured to connect to the accessory devices, update the accessory devices with a third device ecosystem associated with the third device.

In some implementations, process 800 includes prior to is transmitting the accessory information to the second device, validating, by the computing device, a personal identification number (PIN) of the second device received via the second secure channel; and validating the PIN of the second device, upon signing of a second certificate of the second device and validation of the second certificate of the computing device using a second secure element.

In some implementations, process 800 includes prior to is transmitting the accessory information to the third device, validating, by the computing device, a personal identification number (PIN) of the third device received via the third secure channel; and validating the PIN of the third device, upon signing of a third certificate of the third device and validation of the third certificate of the computing device using a third secure element.

In some implementations, the accessory information comprises a template delineating placement of the one or more accessory devices.

Although FIG. 8 shows example steps of process 800, in some implementations, process 800 can include additional steps, fewer steps, different steps, or differently arranged steps than those depicted in FIG. 8. Additionally, or alternatively, two or more of the steps of process 800 can be performed in parallel.

Figure 9:
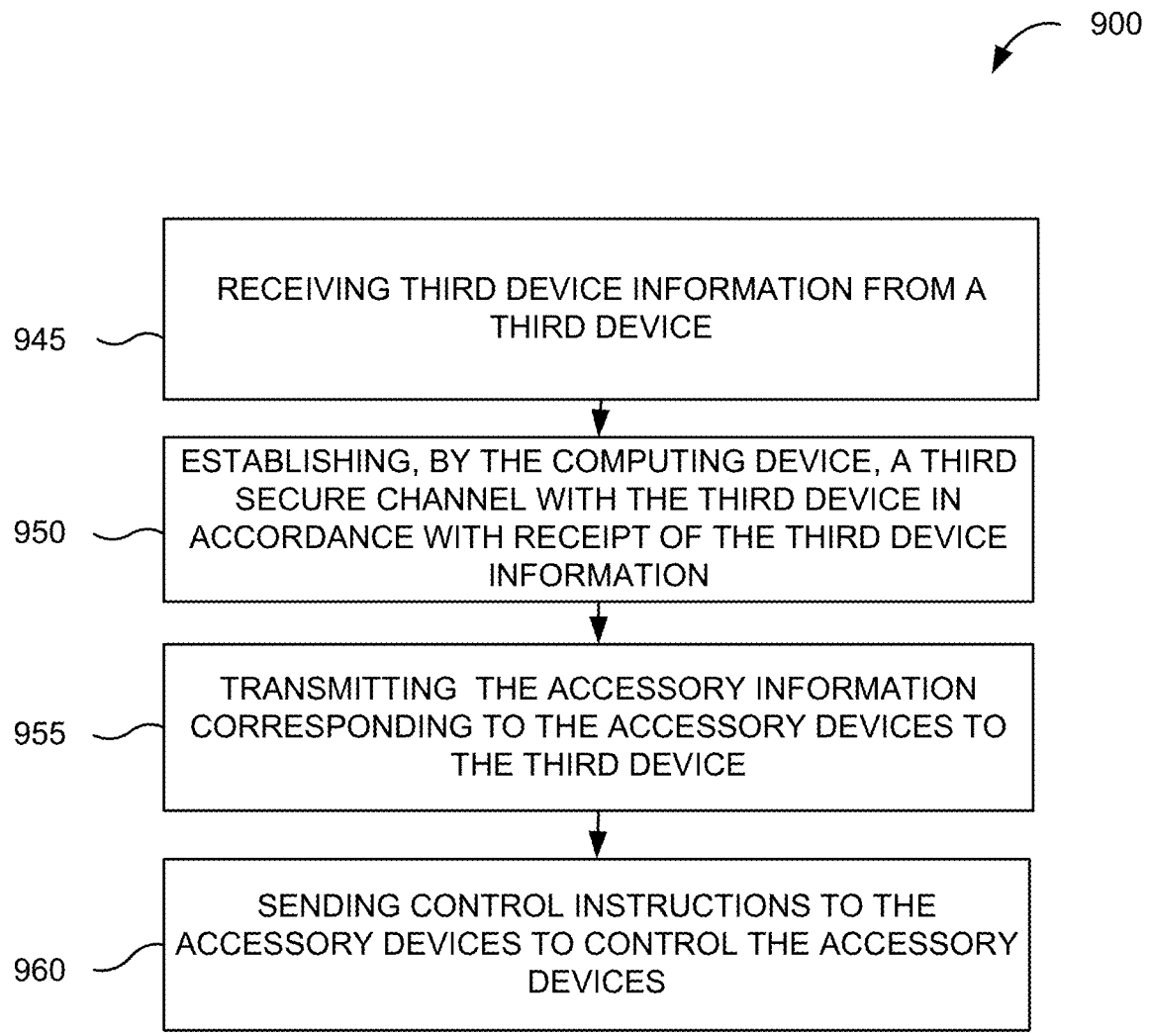
FIG. 9 illustrates a flowchart for a technique for managing a smart home configuration by a home device, in accordance with some example embodiments.

FIG. 9 illustrates a flowchart for a technique for managing a smart home configuration by a home device, in accordance with some example embodiments. FIG. 9 illustrates a flowchart for a technique for managing a smart home configuration by a home device, in accordance with some example embodiments. FIG. 9 is a flow chart of an example process 900 for techniques for managing smart home configuration. In some implementations, one or more process blocks of FIG. 9 can be performed by a computer device. In some implementations, one or more process blocks of FIG. 9 can be performed by another device or a group of devices separate from or including the computer device. The process 900 can be continued from the process 800 described above.

At 950, process 900 can include while the installation mode is off: receiving third device information from a third device. For example, the computer device (e.g., using processor 1118, computer readable medium 1102, applications 1128, wireless circuitry 1108, I/O subsystem 1106, and/or the like as illustrated in FIG. 11 and described below) can while the installation mode is off, as described above.

At 955, process 900 can include establishing a third secure channel with the third device in accordance with receipt of the third device information. For example, the computer device (e.g., using processor 1118, computer readable medium 1102, applications 1128, wireless circuitry 1108, I/O subsystem 1106, and/or the like as illustrated in FIG. 11 and described below) can establish a third secure channel with the third device in accordance with receipt of the third device information, as described above.

At 960, process 900 can include transmitting the accessory information corresponding to the accessory devices to the third device. For example, the computer device (e.g., using processor 1118, computer readable medium 1102, applications 1128, wireless circuitry 1108, I/O subsystem 1106, and/or the like as illustrated in FIG. 11 and described below) can transmit the accessory information corresponding to the accessory devices to the third device, as described above.

At 965, process 900 can include sending control instructions to the accessory devices to control the accessory devices. For example, the computer device (e.g., using processor 1118, computer readable medium 1102, applications 1128, wireless circuitry 1108, I/O subsystem 1106, and/or the like as illustrated in FIG. 11 and described below) can send control instructions to the accessory devices to control the accessory devices, as described above.

Process 900 can include additional implementations, such as any single implementation or any combination of implementations described below and/or in connection with one or more other processes described elsewhere herein. It should be appreciated that the specific steps illustrated in FIG. 9 provide particular techniques for managing smart home configuration according to various embodiments. Other sequences of steps can also be performed according to alternative embodiments. For example, alternative embodiments can perform the steps outlined above in a different order. Moreover, the individual steps illustrated in FIG. 9 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the first device is configured to pair with the accessory devices and configure the accessory devices with a computing device ecosystem associated with the computing device.

In some implementations, the second device is configured to connect to the accessory devices, update the accessory devices with a second device ecosystem associated with the second device, and configure settings of the accessory devices.

In some implementations, the third device is configured to connect to the accessory devices, update the accessory devices with a third device ecosystem associated with the third device.

In some implementations, process 900 includes prior to is transmitting the accessory information to the second device, validating, by the computing device, a personal identification number (PIN) of the second device received via the second secure channel; and validating the PIN of the second device, upon signing of a second certificate of the second device and validation of the second certificate of the computing device using a second secure element.

In some implementations, process 900 includes prior to is transmitting the accessory information to the third device, validating, by the computing device, a personal identification number (PIN) of the third device received via the third secure channel; and validating the PIN of the third device, upon signing of a third certificate of the third device and validation of the third certificate of the computing device using a third secure element.

In some implementations, the accessory information comprises a template delineating placement of the one or more accessory devices.

Although FIG. 9 shows example steps of process 900, in some implementations, process 900 can include additional steps, fewer steps, different steps, or differently arranged steps than those depicted in FIG. 9. Additionally, or alternatively, two or more of the steps of process 900 can be performed in parallel.

VII. Exemplary Home Device

Figure 10:
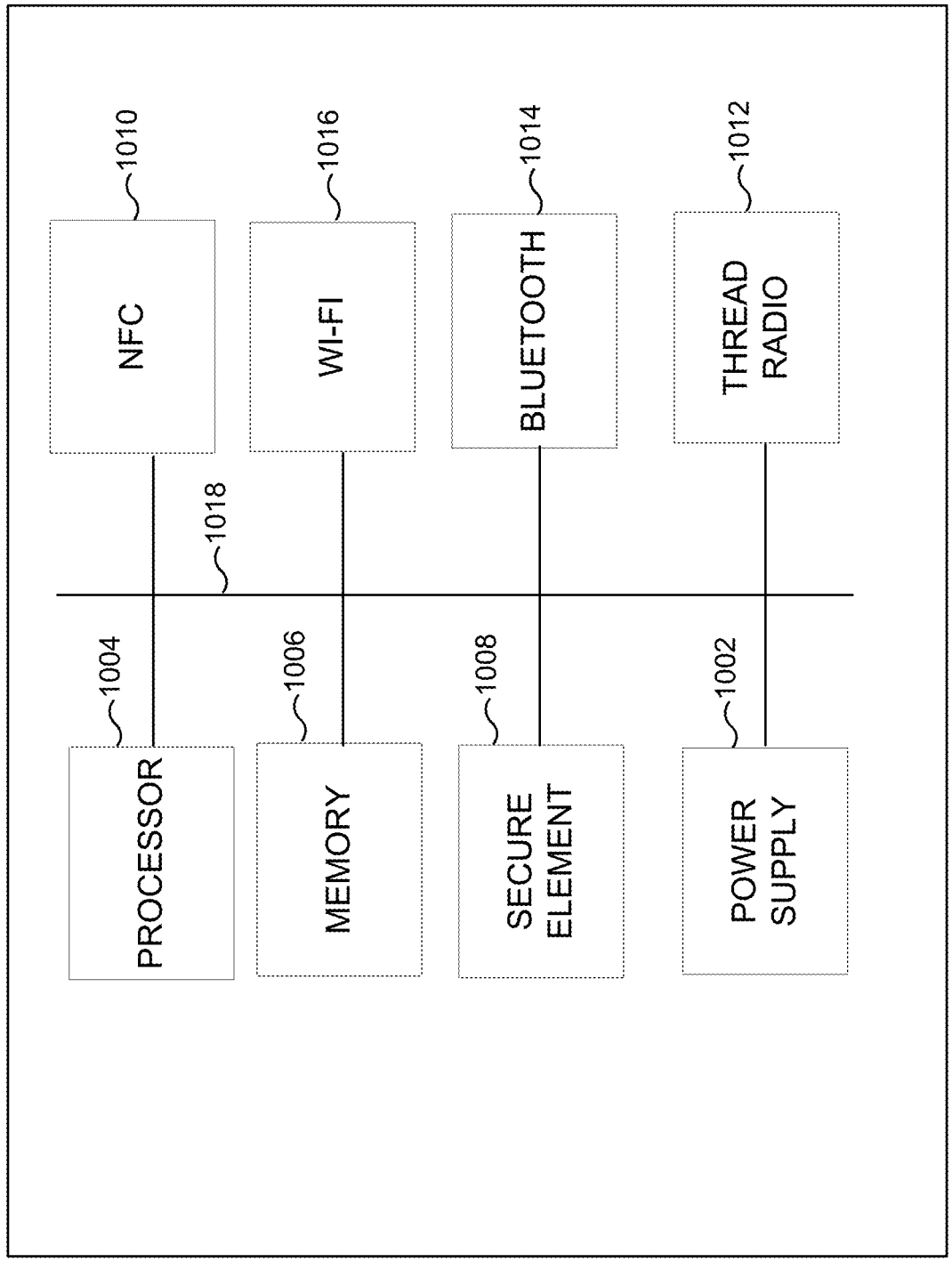
FIG. 10 illustrates a simplified block diagram for a home device for managing a smart home configuration, in accordance with some example embodiments.

FIG. 10 illustrates a simplified block diagram for a home device 1000 for managing a smart home configuration, in accordance with some example embodiments. The home device 1000 can include a power supply 1002, a processor 1004, one or more transceivers, and a memory 1006. The home device 1000 can also include a secure element 1008 for storing one or more secure certificates. The one or more transceivers can include a NFC transceiver 1010, a thread radio 1012, Bluetooth (e.g., BLE) 1014, and Wi-Fi 1016. The home device 1000 can include a bus 1018 for communication of data between the various components of the home device 1000.

The home device 1000 can include a factory installed PIN code. The PIN code can be changed after purchase. In addition, temporary PIN codes can be created. The home device 1000 can support hardware attestation with a device certificate. The certificate can be validated against a public CA (e.g., a ZigBee group). The home device 1000 can generate new root keys at every factory reset.

The home device 1000 can support project Connected Home Over Internet Protocol (CHIP) as a CHIP accessory that can be added to one or multiple ecosystems. The home device 1000 can store a list of accessories based on the home ecosystem. The home device 1000 can list accessories, add accessories, remove accessories, get home device public certificate, sign certificate, generate PIN codes, enable installation mode (restrictions), and disable installation mode.

The home device 1000 can be added to an existing home during retrofit. Homeowners can add the home device 1000 to other home networks (e.g., Homekit). Home network Apps can ask the home device 1000 for CA to certify the home device 1000. The home network App can cause the one or more accessories to enter a setup mode. The home network App can setup the one or more accessories using the home device 1000 CA. The home network App can store accessory metadata into the home device 1000.

The home device 1000 can set one or more rules that determine what accessories the installer can access and what operations are allowed. By default, setting installation mode allows all accessories and all possible actions (e.g., install or remove accessories).

The home device 1000 can create a certificate for the installer and set-up the target accessory. The certificate can provide a list of allowed operations.

The home device 1000 can store a 3D map of the home in the memory 1006 of the home device 1000. The 3D map can provide a detailed, accessory micro-location of one or more accessories. The 3D map can be created by the homebuilder. An installer can scan the home using the installer mobile device and store it in the home device 1000.

The Thread radio 1012 is an IPv6-based, low-power mesh networking technology for IoT products, intended to be secure and future-proof. Thread uses 6LoWPAN, which in turn uses the IEEE 802.15.4 wireless protocol with mesh communication, as does ZigBee and other systems. Thread however is IP-addressable, with cloud access and AES encryption. A BSD licensed open-source implementation of Thread (called "OpenThread") has also been released by Nest. Built on open standards and with IPv6/6LoWPAN protocols, Thread's approach to wireless networking offers a secure and reliable mesh network with no single point of failure and support for low-power end devices. Because it utilizes a mesh network, there is no need to rely on a central access point as with Wi-Fi.

In some embodiments, the home device 1000 can communicate with the one or more accessories via the Thread radio 1012. Thread radio 1012 is both low power and low bandwidth.

The secure element 1008 can be constructed from silicon that has keys embedded in the silicon that is extremely difficult to extract. Using sophisticated silicon, the keys can be almost impossible to extract. The secure element 1008 can include a block fuse that can make the device unusable if it is physically tampered with.

VIII. Exemplary Mobile Device

FIG. 11 illustrates a block diagram of an example mobile device, in accordance with some embodiments. FIG. 11 is a block diagram of an example electronic device 1100. Device 1100 generally includes computer-readable medium 1102, a processing system 1104, an Input/Output (I/O) subsystem 1106, wireless circuitry 1108, and audio circuitry 1110 including speaker 1112 and microphone 1114. Computer-readable medium 1102 can be a non-transitory computer-readable medium. These components may be coupled by one or more communication buses or signal lines 1103. Device 1100 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. Device 1100 can correspond to a controller device or an accessory device.

It should be apparent that the architecture shown in FIG. 11 is only one example of an architecture for device 1100, and that device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. In some embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., Wi-Fi), and/or a long-range wireless transceiver (e.g., GSM/GPRS, UMTS, CDMA2000 1×/EV-DO and LTE/LTE-Advanced) can be used depending on the type of communication or the range of the communication.

Wireless circuitry 1108 is coupled to processing system 1104 via peripherals interface 1116. Peripherals interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats.

Peripherals interface 1116 couple the input and output peripherals of device 1100 to the one or more processors 1118 and computer-readable medium 1102. One or more processors 1118 communicate with computer-readable medium 1102 via a controller 1120. Computer-readable medium 1102 can be any device or medium that can store code and/or data for use by one or more processors 1118. Computer-readable medium 1102 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1116, one or more processors 1118, and controller 1120 can be implemented on a single chip, such as processing system 1104. In some other embodiments, they can be implemented on separate chips.

Processor(s) 1118 can include hardware and/or software elements that perform one or more processing functions, such as mathematical operations, logical operations, data manipulation operations, data transfer operations, controlling the reception of user input, controlling output of information to users, or the like. Processor(s) 1118 can be embodied as one or more hardware processors, microprocessors, microcontrollers, field programmable gate arrays (FPGAs), application-specified integrated circuits (ASICs), or the like.

Device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1100 includes a camera 1144. In some embodiments, device 1100 includes sensors 1146. Sensors can include accelerometers, compass, gyrometer, pressure sensors, audio sensors, light sensors, barometers, and the like. Sensors 1146 can be used to sense location aspects, such as auditory or light signatures of a location. In some embodiments, device 1100 can include a GPS receiver, sometimes referred to as a GPS unit 1148. A mobile device can use a satellite navigation system, such as the Global Positioning System (GPS), to obtain position information, timing information, altitude, or other navigation information. In some embodiments, device 1100 can include external port 1136 (e.g., USB, FireWire, Lightning connector, 110-pin connector, etc.). External port 1136 can be adapted for coupling directly to other devices or indirectly over a network (e.g., the Internet, wireless LAN, etc.).

One or more processors 1118 run various software components stored in computer-readable medium 1102 to perform various functions for device 1100. In some embodiments, the software components include operating system 1122, communication module 1124 (or set of instructions), location and motion module 1126, other applications (computer products, sets of instructions, etc.) 1128, and haptic feedback module 1130. Operating system 1122 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1124 facilitates communication with other devices over external port 1136 or via wireless circuitry 1108 and includes various software components for handling data received from wireless circuitry 1108 and/or external port 1136.

The one or more applications 1134 on device 1100 can include any applications installed on the device 1100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

The state information 1132 can include a power state or mode of operation collected about one or more components of device 1100. State information 1132 can include a power state or mode of operation of components of other devices obtained by device 1100. As the mobile device or the companion device, device 1100 can generate local state information and remote state information in state information 1138. Device 1100 (e.g., using wireless circuitry 1108) can use state information 1132 to manage operations locally in order to reduce power usage. Device 1100 can synchronize all or part of the local state information in state information 1132 with the other devices. The other devices can delay sending messages to device 1100 allowing processors 1118 to remain in a sleep state further reducing power consumption.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or light emitting polymer display (LPD) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1106 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments described herein, e.g., in methods, apparatus, computer-readable media and the like, can be realized using any combination of dedicated components and/or programmable processors and/or other programmable devices. The various processes described herein can be implemented on the same processor or different processors in any combination. As used herein, a processor includes a single-core processor, multi-core processor on a same integrated chip, or multiple processing units on a single circuit board or networked. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although specific example embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

As described above, one aspect of the present technology is the gathering and use of data available from specific and legitimate sources to improve the delivery to users of invitational content or any other content that may be of interest to them when updating firmware. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, and exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggested customizations can be selected and delivered to users by inferring preferences based on non-personal information data or a bare minimum amount of personal information, such as the content being requested by the device associated with a user, other non-personal information available to the avatar application, or publicly available information.

Further, while example embodiments have been described using a particular combination of hardware and software, it should be recognized that other combinations of hardware and software are also within the scope of the example embodiments. Some of the example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

All patents, patent applications, publications, and descriptions mentioned herein are incorporated by reference in their entirety for all purposes. None is admitted to be prior art.

What is claimed is:

1. A method performed by a mobile device, comprising:
   identifying a home device using a first wireless protocol;
   enabling a secure channel between the home device and the mobile device via a second wireless protocol;
   authenticating access for the mobile device using an identification code;
   after the secure channel is established: receiving a home device certificate from the home device;
   validating the home device certificate of the home device via a secure server by:
      transmitting the home device certificate to the secure server; and
      receiving, from the secure server, a message identifying the home device certificate as being validated;
   in response to receiving the message identifying the home device certificate as being validated, sending a mobile device certificate of the mobile device to the home device via the secure channel, wherein the home device is configured to sign the mobile device certificate to create a signed mobile device certificate, and wherein the signed mobile device certificate expires after a predetermined length of time;
receiving the signed mobile device certification from the home device via the secure channel;
receiving accessory information corresponding to one or more accessory devices from the home device via the secure channel;
connecting to the one or more accessory devices based at least in part on the accessory information; and
authorizing, using the signed mobile device certificate, the one or more accessory devices to operate in a home ecosystem.

2. The method of claim 1, wherein the mobile device comprises a graphical user interface to receive one or more inputs to adjust settings of the one or more accessory devices.

3. The method of claim 1, further comprising updating the one or more accessory devices with a device ecosystem associated with the mobile device.

4. The method of claim 1, further comprising transmitting, to the secure server, the home device certificate of the home device prior to connecting to the one or more accessory devices.

5. The method of claim 1, further comprising:
sending the signed mobile device certificate to the at an accessory device of the one or more accessory devices to enter a set-up mode;
receiving one or more inputs from the mobile device, the one or more inputs specifying a configuration for the accessory device; and
sending the configuration for the accessory device to the accessory device.

6. The method of claim 1, wherein the first wireless protocol comprises near field communication.

7. The method of claim 1, wherein the accessory information includes at least one of an accessory identifier, an accessory capabilities, or a current accessory setting.

8. A non-transitory computer-readable storage medium storing a set of computer-executable instructions that, when executed by one or more processors of a mobile device, cause the mobile device to perform operations comprising:
identifying a home device using a first wireless protocol;
enabling a secure channel between the home device and the mobile device via a second wireless protocol;
authenticating access for the mobile device using an identification code;
after the secure channel is established: receiving a home device certificate from the home device;
validating the home device certificate of the home device via a secure server by:
transmitting the home device certificate to the secure server; and
receiving, from the secure server, a message identifying the home device certificate as being validated;
in response to receiving the message identifying the home device certificate as being validated, sending a mobile device certificate of the mobile device to the home device via the secure channel, wherein the home device is configured to sign the mobile device certificate to create a signed mobile device certificate, and wherein the signed mobile device certificate expires after a predetermined length of time;
receiving the signed mobile device certificate from the home device via the secure channel;
receiving accessory information corresponding to one or more accessory devices from the home device via the secure channel;
connecting to the one or more accessory devices based at least in part on the accessory information; and
authorizing, using the signed mobile device certificate, the one or more accessory devices to operate in a home ecosystem.

9. The non-transitory computer-readable medium of claim 8 wherein the mobile device comprises a graphical user interface to receive one or more inputs to adjust settings of the one or more accessory devices.

10. The non-transitory computer-readable medium of claim 8, further comprising updating the one or more accessory devices with a device ecosystem associated with the mobile device.

11. The non-transitory computer-readable medium of claim 8, further comprising transmitting, to the secure server, the home device certificate of the home device prior to connecting to the one or more accessory devices.

12. The non-transitory computer-readable medium of claim 8, wherein the mobile device is further caused to perform operations comprising:
sending the signed mobile device certificate to the at an accessory device of the one or more accessory devices to enter a set-up mode;
receiving one or more inputs from the mobile device, the one or more inputs specifying a configuration for the accessory device; and
sending the configuration for the at least one-accessory device to the accessory device.

13. The non-transitory computer-readable medium of claim 8, wherein the first wireless protocol comprises near field communication.

14. The non-transitory computer-readable medium of claim 8, wherein the accessory information includes at least one of an accessory identifier, an accessory capabilities, or a current accessory setting.

15. A mobile device, comprising:
one or more memories; and
one or more processors, communicatively coupled to the one or more memories, configured to perform operations to:
identify a home device using a first wireless protocol;
enable a secure channel between the home device and the mobile device via a second wireless protocol;
authenticate access for the mobile device using an identification code;
after the secure channel is established: receive a home device certificate from the home device;
validate the home device certificate of the home device via a secure server by:
transmitting the home device certificate to the secure server; and
receiving, from the secure server, a message identifying the home device certificate as being validated;
in response to receiving the message identifying the home device certificate as being validated, send a mobile device certificate of the mobile device to the home device via the secure channel, wherein the home device is configured to sign the mobile device certificate to create a signed mobile device certificate, and wherein the signed mobile device certificate expires after a predetermined length of time;
receive the signed mobile device certificate from the home device via the secure channel;

receive accessory information corresponding to one or more accessory devices from the home device via the secure channel;

connect to the one or more accessory devices based at least in part on the accessory information; and authorize, using the signed mobile device certificate, the one or more accessory devices to operate in a home ecosystem.

16. The mobile device of claim 15, wherein the mobile device comprises a graphical user interface to receive one or more inputs to adjust settings of the one or more accessory devices.

17. The mobile device of claim 15, further comprising updating the one or more accessory devices with a device ecosystem associated with the mobile device.

18. The mobile device of claim 15, further comprising transmitting, to the secure server, the home device certificate of the home device prior to connecting to the one or more accessory devices.

19. The mobile device of claim 15, wherein the one or more processors are further configured to perform operations to:

send the signed mobile device certificate to the at an accessory device of the one or more accessory devices to enter a set-up mode;

receive one or more inputs from the mobile device, the one or more inputs specifying a configuration for the accessory device; and send the configuration for the accessory device to the accessory device.

20. The mobile device of claim 15, wherein the first wireless protocol comprises near field communication.

* * * * *

UNITED STATES PATENT AND TRADEMARK OFFICE
CERTIFICATE OF CORRECTION

PATENT NO. : 12,199,817 B2
APPLICATION NO. : 17/402369
DATED : January 14, 2025
INVENTOR(S) : Oren Segal et al.

Page 1 of 1

It is certified that error appears in the above-identified patent and that said Letters Patent is hereby corrected as shown below:

In the Claims

Column 26, Line 24: In Claim 12, delete "at an accessory device" and insert --accessory device--.

Column 26, Line 30: In Claim 12, delete "at least one-accessory device" and insert --accessory device--.

Signed and Sealed this
Twenty-fifth Day of February, 2025

Coke Morgan Stewart
*Acting Director of the United States Patent and Trademark Office*